J. A. ALTHOUSE.
Hay Loader.
No. 26,225.
Patented Nov. 22, 1859.
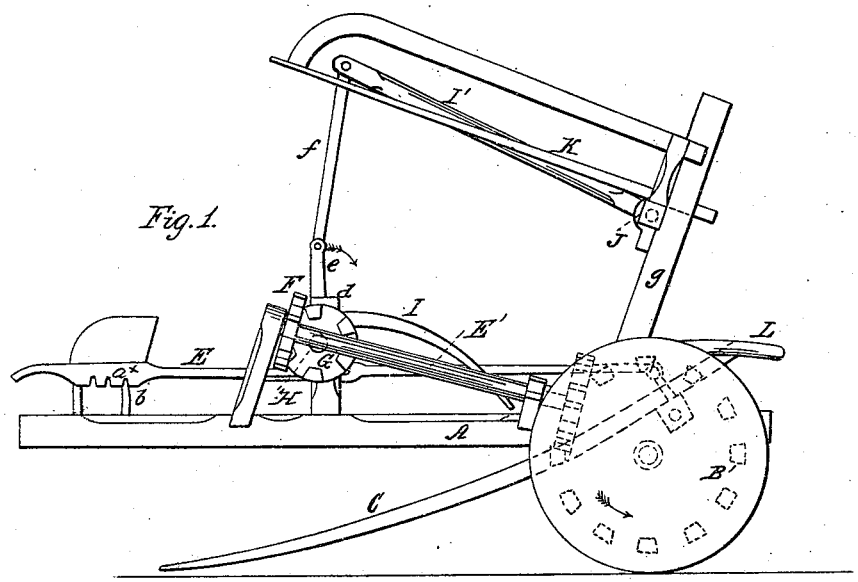
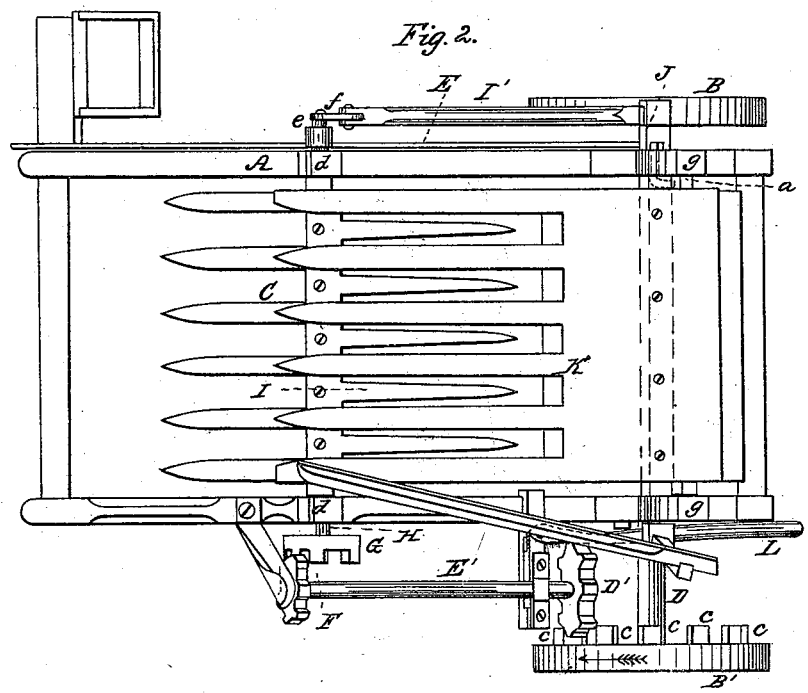
Witnesses:
Inventor:

UNITED STATES PATENT OFFICE.

J. A. ALTHOUSE, OF PHILLIPSTOWN, ILLINOIS, ASSIGNOR TO HIMSELF AND F. W. LECHTENBERGER, OF NEW HARMONY, INDIANA.

IMPROVEMENT IN MACHINES FOR RAKING AND LOADING HAY.

Specification forming part of Letters Patent No. 26,225, dated November 22, 1859.

*To all whom it may concern:*

Be it known that I, J. A. ALTHOUSE, of Phillipstown, in the county of White and State of Illinois, have invented a new and Improved Hay and Grain Loading Attachment to be Applied to Wagons or Carts; and I do hereby declare that the following is a full, clear, and exact description of the same, reference being had to the annexed drawings, making a part of this specification, in which—

Figure 1 is a side view of my invention. Fig. 2 is a plan or top view of the same.

Similar letters of reference indicate corresponding parts in the two figures.

This invention consists in the employment or use of a stationary, revolving, and vibrating rake, mounted on wheels and arranged for joint operation substantially as hereinafter shown, whereby hay or grain may be thrown into or loaded on a wagon or cart with far greater facility than by the usual exclusively manual process.

To enable those skilled in the art to fully understand and construct my invention, I will proceed to describe it.

A represents a rectangular frame, the back part of which is supported by two wheels, B B'.

On the back part of the frame A a rake, C, is placed. This rake C has its back part attached to a bar or shaft, D, which is allowed to turn freely in its bearings. The rake C has its teeth slightly curved, and their lower ends rest on the earth by their own gravity.

To one end of the shaft D an arm, $a$, is attached, the outer end of said arm being connected to a rod, E, which is notched at its front end, as shown at $a^x$, so that either of said notches may be fitted on a plate, $b$, to secure the rake C in an elevated position when not in use, or when it is not necessary to have it resting on the ground.

The inner side of the wheel B' has teeth $c$ attached, and these teeth gear into a pinion, D', on the back part of a shaft, E', said shaft having a pinion, F, on its front end, which pinion gears into a corresponding pinion, G, on a shaft, H, the journals of which have their bearings in uprights $d\ d$ on the frame A.

To the shaft H a rake, I, is attached. This rake is provided with curved teeth, as shown plainly in Fig. 1. At the end of the shaft H opposite to the end where the pinion G is attached there is a crank, $e$, which has a link, $f$, secured to it, said link being connected to an arm, I', at one end of a shaft, J, which has its bearings in uprights $g\ g$ on the frame A.

To the shaft J the back part of a rake, K, is attached. The teeth of this rake K are in line with the spaces between the teeth of the rake I, and the teeth of the rake I are in line with the spaces between the teeth of the rake C. (See Fig. 2.)

The back bearing of the shaft E' is allowed to slide to a certain extent, and a lever, L, is attached to it, by actuating which the pinion D' may be thrown in and out of gear with the teeth $c$ of wheel B'.

The operation is as follows: The frame A is attached to the front of a wagon or cart, and as the former is drawn along the rake C gathers up the hay or cut grain in front of it. The rake I is made to revolve in the direction indicated by arrow 1 through the medium of the gearing $c$ D' F G, and the teeth of rake I, as the latter revolves, pass between the teeth of rake C and throw the hay or grain upon the rake K, which has a vibrating movement given it in a vertical plane through the medium of the crank $e$, link $f$, and arm I', the rake K descending to meet the teeth of the rake I as they rise with their load, and receiving said load and elevating it until the rake reaches an inclined position, when the load is drawn down by an attendant into the body of the cart or wagon.

When the device is not in use or is being drawn from place to place the rake C is elevated free from the earth by shoving the rod E backward and securing it by means of the notches $a^x$ and plate $b$.

This invention will save much labor, as a cart or wagon may be loaded rapidly and the ground over which the device passes raked perfectly clean.

The invention may be constructed at a moderate cost and may be readily kept in proper working order, as there are no parts liable to become deranged by use.

Having thus described my invention, what I claim as new, and desire to secure by Letters Patent, is—

The combination of the stationary rake C, revolving rake I, and vibrating rake K, placed on a mounted frame, and arranged for joint operation substantially as and for the purpose set forth.

J. A. ALTHOUSE.

Witnesses:
 DAVID HEASTY,
 J. H. GASH.